Figure 1:
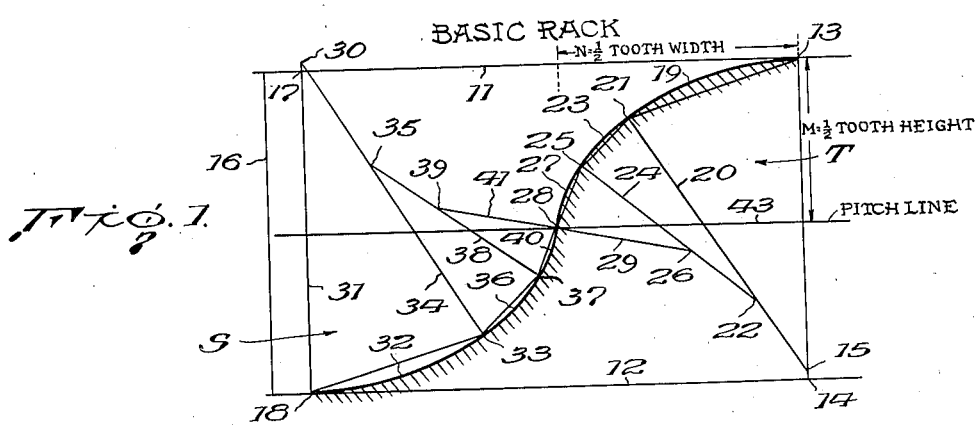

Nov. 19, 1940.     R. J. S. PIGOTT     2,222,515
GEARING
Filed Jan. 13, 1940     2 Sheets-Sheet 1

Inventor
R.J.S. Pigott,
By A. M. Houghton
his Attorney

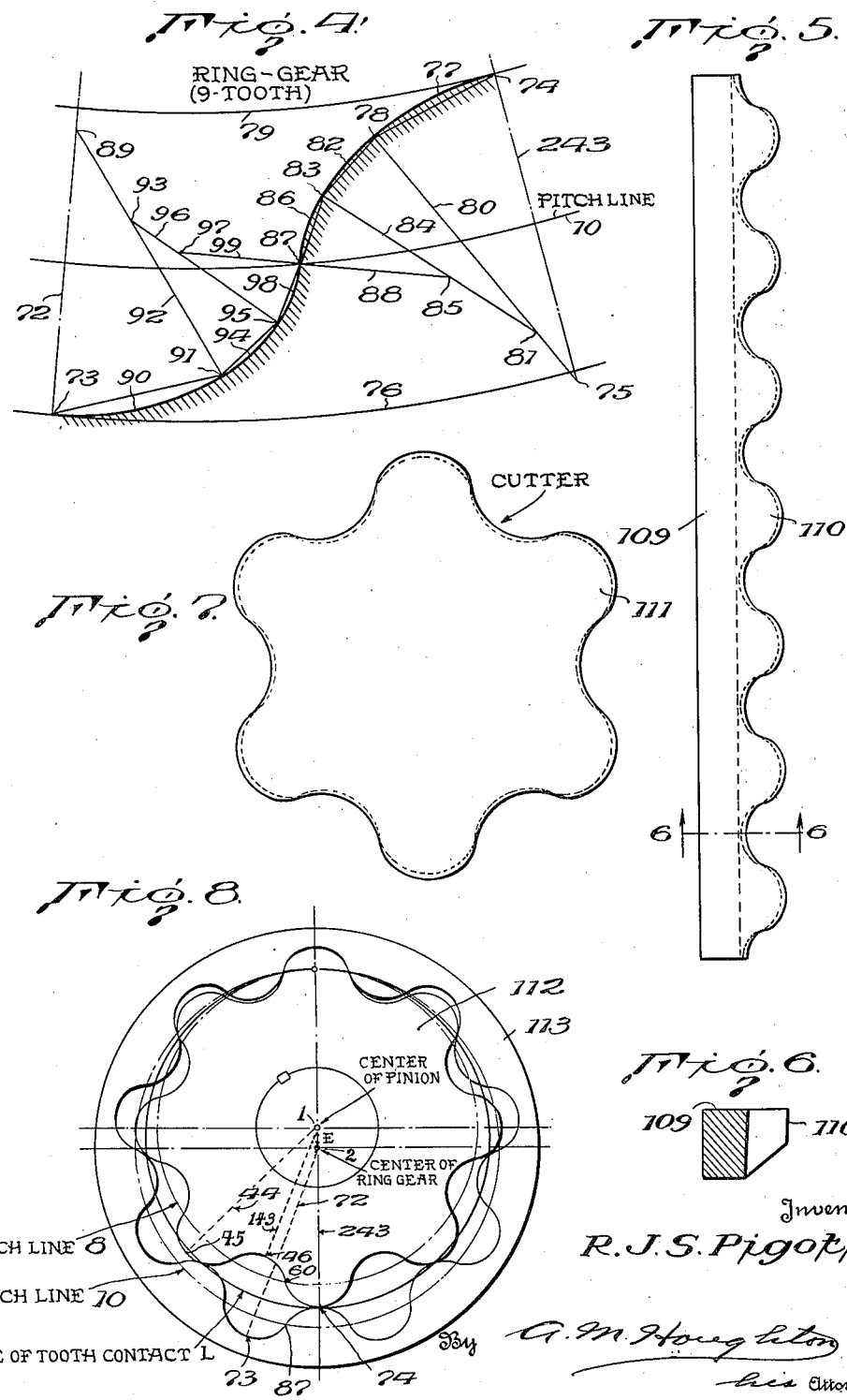

Patented Nov. 19, 1940

2,222,515

UNITED STATES PATENT OFFICE 2,222,515

GEARING

Reginald J. S. Pigott, Pittsburgh, Pa., assignor to Gulf Research & Development Company, Pittsburgh, Pa., a corporation of Delaware Application January 13, 1940, Serial No. 313,782

7 Claims. (Cl. 74—462)

This invention or discovery relates to gearing; and it comprises gearing, and in particular external-internal pumping gears of one tooth difference, the teeth and tooth spaces of which correspond to those generated from a basic rack of which the contours of the teeth and of the tooth spaces are substantially segments of logarithmic spirals of formula $r=c\epsilon^{YA}$ and $r=c\epsilon^{ZA}$ respectively, wherein $r$ and $A$ are polar coordinates, $Y$ is a constant equal to 0.65 or greater, $Z$ is a constant equal to 0.85 or less, and $c$ is a factor equal to ⅕ the tooth height; all as more fully hereinafter set forth and as claimed.

There have recently come into use gear pumps having a ring gear and a pinion, of one tooth difference, with teeth of such size and shape as to afford continuous sliding tooth contact. In rotation the teeth and inter-tooth spaces define an unbroken series of gradually expanding chambers on the inlet size of the gear combination and a series of gradually collapsing chambers on the discharge side, thereby affording a quasi-continuous pumping action. Such pumps (see my prior Patents 1,990,750, 2,053,919 and 2,055,587) have a remarkably high capacity and are advantageous in other respects. They have proved useful in many fields. In a prior Patent 1,909,117 upon which the present invention is an improvement I have disclosed and claimed a particularly advantageous tooth contour for such pumping gears. The tooth contours of the gears correspond to teeth of a basic rack, the curvature of which is defined by portions of logarithmic spirals. In making a set of gears according to this prior patent two cutters are used, one shaped with reference to one side of the basic rack form, so to speak, and the other formed from the other side thereof.

I have now discovered that by a modification of the tooth shapes disclosed in Patent 1,909,117 while preserving their logarithmic spiral character a basic rack can be laid out, of such nature that a single cutter made from it is capable of cutting both the externally toothed gear (pinion) and the internally toothed gear (ring gear) of a given set, with consequent simplification of the manufacturing operations. The tooth shape of the basic rack corresponds to certain logarithmic spirals. Were it not necessary to take into account clearance and backlash of the gears, the teeth and tooth spaces of the basic rack of the present invention could indeed be symmetrical about the pitch line; both could be contoured according to the same spiral. Since clearance and backlash must be provided for, the teeth and tooth spaces are not exactly symmetrical; nevertheless, one cutter formed from the basic rack serves to cut both ring gears and pinions of any given ratio.

In particular, according to the invention in its best embodiment a basic rack is laid out having teeth the curves of which are portions of logarighmic spirals of the formula $r=c\epsilon^{0.70A}$, and inter-tooth spaces of curvature represented by $r=c\epsilon^{0.80A}$, wherein $r$ and $A$ are polar coordinates, $\epsilon$ is the napierian logarithmic base, and $c$ is a factor equal to ⅕ the tooth height expressed in the same units as $r$ (inches). These formulae hold for all basic racks for the cutting of gears of one tooth difference regardless of pitch diameter, number of teeth and tooth height. As explained in detail below, for any one set of gears the tooth height is fixed.

The above exponential constants (0.70 and 0.80) are suitable for normal requirements as regards backlash and clearance of the gear set. If greater backlash and clearance are desired, these constants can be of a greater difference, e. g. 0.68 and 0.82 respectively. The practical extremes for these constants for the two spirals are approximately 0.65 and 0.85 respectively; with a greater difference there is apt to be excessive clearance and backlash. On the other hand, if finer fitting is desired, the two constants can have somewhat less arithmetical difference; for example, they can be 0.71 and 0.79 respectively. Thus the generalized spiral formulas for my basic rack are $r=c\epsilon^{YA}$ and $r=c\epsilon^{ZA}$, wherein $Y$ can range from about 0.85 to somewhat over 0.70, and $Z$ can range from about 0.85 to somewhat below 0.80.

Figure 2:
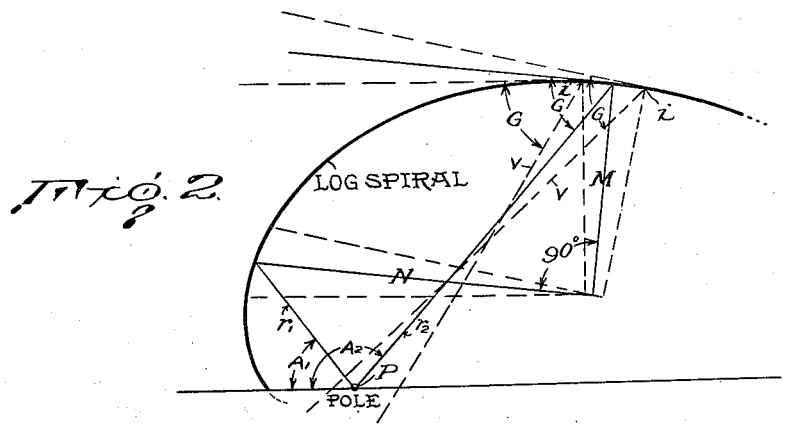
Figure 3:
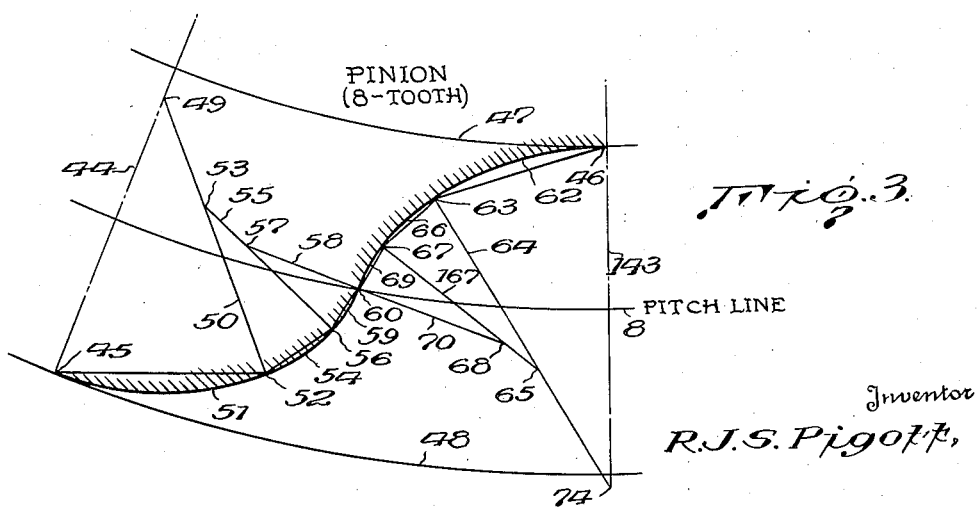

In the accompanying drawings I have shown more or less diagrammatically examples of gearing made according to the best embodiment of the invention and charts illustrative of the principles upon which the invention is based. In the drawings, Fig. 1 is a schematic showing of one-half of a tooth and one-half of a tooth space of a basic rack of the invention, Fig. 2 is a chart showing a portion of one of the spirals and illustrating how the correct portion of the spiral for tooth contours is selected, Fig. 3 is a showing, similar to Fig. 1, of one-half of a tooth and one-half a tooth space of an 8-tooth pinion made according to the invention, Fig. 4 is a similar showing for a 9-tooth ring gear to mesh with the pinion of Fig. 3, Fig. 5 is a view in elevation of a basic rack cutter, Fig. 6 is a sectional view taken along line 6—6 of Fig. 5, Fig. 7 is a plan view of a cutter made from the rack of Fig. 5 and Fig. 8 is a view in elevation of a pair of pumping gears of tooth shape corresponding to Figs. 3 and 4.

Referring to the drawings, Fig. 1 shows in diagrammatic manner one-half of a tooth T and one-half of an inter-tooth space S of the basic rack of the invention. The parts which are solid are conventionally indicated by hatching. The curvature of the half tooth (approximated by arcs 19, 23, 27) is that of a certain portion of a logarithmic (equiangular) spiral of formula $r = c\epsilon^{0.70A}$, wherein $r$ and $A$ are polar coordinates, expressed in inches and in radians (1 radian = 57.3 degrees approximately) respectively and $c$ is ⅕ the tooth height expressed in inches. The equation can also be expressed as $$\log_\epsilon r = 0.70A + \log_\epsilon c$$

The curvature of the half tooth space (arcs 32, 36, 40) is that of a portion of a logarithmic spiral of formula $$r = c\epsilon^{0.80A}$$

or $$\log_\epsilon r = 0.80A + \log_\epsilon c$$

Fig. 2 illustrates the manner in which the correct part of the spiral is selected for the half tooth of Fig. 1. A section of a logarithmic spiral is drawn up according to the formula $r = c\epsilon^{0.70A}$; the spiral, mathematically considered, can be prolonged infinitely each way from and toward the pole P of the spiral. The portion of the logarithmic spiral used for one-half of the basic rack tooth is determined by a right angle one of whose sides, M, is equal to the tooth height (cf. Fig. 1) measured from the pitch line and the other of whose sides, N, is equal to one-half of the tooth width measured along the pitch line. (Similarly, the portion of the logarithmic spiral used for one-half of the basic rack space is determined by a right angle whose sides are equal to the tooth depth measured from the pitch line and one-half of the space width measured along the pitch line). The segments of the logarithmic spirals which subtend these right angles must be such that the radius vectors $r_1$ and $r_2$ drawn from the ends of the segments at the constant tangent angle G (tangent G = 1/0.70 for the tooth and 1/0.80 for the space) will pass through the pole. These radius vectors correspond to angles $A_1$ and $A_2$ as shown. The correct position is shown by solid lines; the dotted lines show incorrect positions in that the vectors $v$ drawn from the intersections $i$ of the legs of the right angle, with the curve, at the constant tangency angle G, do not pass through the pole. Of course, a tooth curve of any absolute size can be selected, following the above principles; for example the tooth height M can be 0.1 inch, 1 inch, 2 inches or any other desired value.

Figs. 3 and 4 are diagrams, similar to Fig. 1, of the half-tooth and half-tooth-spaces of an 8-tooth pinion and mating 9-tooth ring gear, which are shown in elevation in Fig. 8 at 112 and 113.

Figs. 5 and 6 show a basic rack embodied as a cutter 109, which is made of suitable hardened steel with chamfered cutting teeth 110 as shown. Fig. 7 shows a cutter made from the rack, having six cutting teeth 111. The cutter can be made with any number of cutting teeth greater than two and sufficiently less than the number of teeth in the ring gear to be cut therewith, to permit the cutter to enter the annular blank from which the ring gear is to be cut. In practice, cutters with four, five or six teeth are most useful. In making gears the cutter is operated in a gear shaper in a way known per se.

A single cutter can be used for making both the ring gear and the pinion of a given set. Different cutters are needed, for cutting different gear sets, that is to say, sets of different tooth heights. For example, on the 4 inches pitch diameter, 8-tooth pinion and the 4½ inches pitch diameter, 9-tooth ring gear, the tooth height is equal to ½ inch which in turn is equal to the difference in the pitch diameters or twice the eccentricity (E in Fig. 8). In this case the width of one tooth independent of backlash would be equal to $4\pi/16 = 4.5\pi/18$. If an attempt were made to cut a 4 inches pitch diameter, 8-tooth pinion of different tooth height, say ⅝ inch, in order for the tooth tips to pass in the out-of-mesh position, it would be necessary for the pitch diameter of the ring gear to be 4.625 inches. In this case the tooth width would have to be changed in order to provide 9 teeth since $4\pi/16$ does not equal $4.625\pi/18$ or conversely, the number of teeth would have to be changed in order to maintain the same tooth width.

The cutter is useful in making gear sets of any tooth ratio from 6:7 up, which is a practical limit anyway for pump gear ratios. Gear sets of ratio 7:8 and 8:9 are on the whole the most useful. In these ratios the figures also indicate the number of teeth on the pinion and on the ring gear. Fig. 8 shows a typical gear set made according to the invention, with an 8-tooth pinion 112 and a 9-tooth ring gear 113. The line of tooth contact is shown at L.

For the sake of illustration the following tabulation sets forth the constants for four different gear ratios each of ½ inch tooth height and of pitch diameters ranging from 3 to 4.5 inch for the pinion and from 3.5 to 5 inch for the ring gear. The dimensions are in inches.

| Pinion | | | Ring gear | | | Basic rack formulas | |
|---|---|---|---|---|---|---|---|
| Pitch diameter | No. of teeth | Tooth height | Pitch diameter | No. of teeth | Tooth height | Half tooth | Half space |
| 3.00 | 6 | .50 | 3.50 | 7 | .50 | $r = 0.1\epsilon^{0.70A}$ | $r = 0.1\epsilon^{0.80A}$ |
| 3.50 | 7 | .50 | 4.00 | 8 | .50 | | |
| 4.00 | 8 | .50 | 4.50 | 9 | .50 | | |
| 4.50 | 9 | .50 | 5.00 | 10 | .50 | | |

The gearing of the present invention has all the advantages of that described in my prior Patent 1,909,117, with the additional advantage that both gears of a given set can be cut with a single cutter formed from a single basic rack. Among these advantages are the provision of a plurality of simultaneous tooth contacts to distribute and reduce driving pressures; constant velocity ratio and good action even if the center distance between the gears is not exactly correct; tooth contacts of such shape and character as to form good fluid seals; and, in general, smooth and efficient pumping action.

The gears are ordinarily embodied in steel or other metal and are made by cutting, but they can of course be made by other procedures such as casting and they can be embodied in suitable non-metallic materials.

The shapes of the teeth and spaces on the basic rack, cutter, internal and external gears are, for practical purposes, most conveniently defined geometrically by a series of circular arcs, as is customary in laying out all higher order curves. The curves shown in Figs. 1, 3 and 4 are constructed in this manner.

Fig. 1 shows the manner of laying out a basic rack for the length of one-half of a tooth and one-half of a space. Draw the parallel lines 11 and 12 tangent to the top of a tooth and tangent to the bottom of a space. At the right end, draw the center line 13—14 of the tooth at right angles to the lines 11 and 12. The length of the line 13—14 and of the line 16 represents the total tooth height while the line 13—17 or the line 14—18 represents one-half of the tooth length plus one-half of the space. From the point 15 on the line 13—14 and with the radius 15—13 draw to the left the arc 19 from the point 13 and at the final end 21 of the arc, draw the radius 20 from point 15 to 21. From the point 32 on the radius 20, draw the arc 23 from the point 21 to the point 25 and draw the radius 24 from the point 22 to the point 25. From the point 26 on the radius 24, draw the arc 27 from the point 25 to the point 28 and draw the radius 29 from point 26 to 28. This completes the one-half of the tooth above the pitch line 43.

Beginning now at the point 30 on the center line 17—18 above line 11 draw therefrom with the radius 30—18 the arc 32 to the right from the point 18 to the point 33. Draw the radius 34 between the points 30 and 33. From the point 35 on the radius 34, draw the arc 36 from the point 33 to the point 37 and draw the radius 38 between the points 35 and 37. From the point 39 as a center on the radius 38, draw the arc 40 from the point 37 to the half-way point 28 on the pitch line 43 and draw the radius 41 between the points 39 and 28. The dimensions of certain of the various radii and chords of the said arcs are set forth in the following table, the tooth height indicated by the line 13—14 or the line 17—18 being unity.

| | | | |
|---|---|---|---|
| Line 16 | 1.0000 | Chord of arc 32 | .5757 |
| Radius 20 | .9713 | Radius 38 | .6337 |
| Chord of arc 19 | .5795 | Chord of arc 36 | .2542 |
| Radius 24 | .6745 | Radius 41 | .3777 |
| Chord of arc 23 | .2056 | Chord of arc 40 | .1685 |
| Radius 29 | .4402 | Line 14—15 | .0287 |
| Chord of arc 27 | .2018 | Line 13—17 | 1.5771 |
| Radius 34 | 1.0040 | Line 17—30 | .0040 |

Fig. 3 shows how one-half of a tooth and one-half of a space of an 8-tooth external pinion may be defined geometrically. The tooth contour is closely approximated as follows: Fig. 3 may be regarded as corresponding to the contour of one-half a tooth and one-half a space lying between the center line 143 of the tooth space which includes the center 1 and the line 44 drawn from the center 1 to the top of the pinion tooth, the center of the top of the tooth being indicated at 45, and the center of the bottom of the space being indicated at 46. 47 and 48 are circles tangent to the bottoms of the spaces and tops of the teeth respectively.

To draw the tooth contour for one-half of a tooth and one-half of a space for an 8-tooth external pinion, start on the center line 44 at the point 49 below the circle 47, and with the radius 50 or 49—45 draw the arc 51 toward the right from the point 45 to the point 52. Draw the radius 50 from the point 49 to the point 52. From the point 53 on the radius 50 draw the arc 54 from the point 52 to the point 56 and draw the radius 55 from the point 53 to the point 56. From the point 57 on the radius 55 draw the arc 59 from the point 56 to the point 60 on the pitch circle 8 and draw the radius 58 from the point 57 to the point 60.

From the point 74 on the center line 143 below the circle 48, draw the arc 62 to the left from the point 46 to the point 63. Draw the radius 64 from the point 74 to the point 63. From the point 65 on the radius draw the arc 66 from the point 63 to the point 67 and draw the radius 167 from the point 65 to the point 67. From the point 68 on the radius 167 draw the arc 69 from the point 67 to the point 60 on the pitch circle 8 and draw the radius 70 from the point 68 to the point 60. The contour of the 8-tooth external pinion is thus indicated by the tandem arcs 51, 54, 59, 69, 66 and 62. The dimensions of the various radii and chords of the said arcs are set forth in the following table, the tooth height indicated by the line 143 between the circles 47 and 48 being unity.

| | | | |
|---|---|---|---|
| Line 46 to circle 48 | 1.0000 | Chord of arc 69 | .1434 |
| Radius 64 | 1.0542 | Radius 50 | .9131 |
| Chord of arc 62 | .5647 | Chord of arc 51 | .6588 |
| Radius 167 | .6369 | Radius 55 | .5484 |
| Chord of arc 66 | .2259 | Chord of arc 54 | .2404 |
| Radius 70 | .4954 | Radius 58 | .4002 |
| | | Chord of arc 59 | .1428 |

Fig. 4 shows how to draw the contour of one-half of a tooth and one-half of a space of the 9-tooth internal ring gear corresponding to the 8-tooth external pinion section shown in Fig. 3. The contour of one-half of a tooth and one-half of a space of the ring gear may be considered that shown between the center line 243 and the center line 72 drawn from the center of the gear to the point 73 at the center of the bottom of the space, the center of the top of the tooth being designated as point 74. The contour shown in Fig. 4 is laid out as follows, the tooth height 74 to the circle 76 or 73 to the circle 79 being unity.

From the point 75 below the intersection of the line 243 with the circumscribed circle 76 tangent to the bottom of the ring gear spaces, draw the arc 77 from the point 74 to the point 78, the point 74 being in the circle 79 which is tangent to the tops of the teeth. Draw the radius 80 from the point 75 to the point 78. From the point 81 on the radius 80, draw the arc 82 from the point 78 to the point 83 and draw the radius 84, from the point 81 to the point 83. From the point 85 on the radius 84, draw the arc 86 from the point 83 to the point 87 on the pitch circle 10 and draw the radius 88 from the point 85 to the point 87.

From the point 89 below the intersection of line 72 with the circle 79 which is the inscribed circle tangent to the tops of the ring gear teeth, draw the arc 90 from the point 73 to the point 91, the point 73 being at the intersection of the center line 72 with the circle 76. Draw the radius 92 between the points 89 and 91. From the point 93 on the radius 92 draw the arc 94 from the point 91 to the point 95 and draw the radius 96 between the point 93 and the point 95. From the point 97 on the radius 96 draw the arc 98 from the point 95 to the point 87 on the pitch circle 10 and draw the radius 99 from the point 97 to the point 87. The contour of the ring gear in Fig. 4 comprises the tandem arcs 77, 82, 86, 98, 94 and 90. The dimensions of the parts referred to in Fig. 4 are as follows:

| | | | |
|---|---|---|---|
| Radius 92 | .9538 | Radius 80 | 1.0281 |
| Chord of arc 90 | .5843 | Chord of arc 77 | .4508 |
| Radius 96 | .6084 | Radius 84 | .8744 |
| Chord of arc 94 | .2576 | Chord of arc 82 | .2510 |
| Radius 99 | .4584 | Radius 88 | .5024 |
| Chord of arc 98 | .2094 | Chord of arc 86 | .2337 |

Pitch line 10 between center lines 243 and 47 _____ 1.5771

What I claim is:

1. In gearing, a basic rack from which can be generated both a ring gear and a mating pinion of one less tooth, said rack having teeth and tooth spaces, the half-contour of which are segments of logarithmic spirals of formulas $r=c\epsilon^{YA}$ and $r=c\epsilon^{ZA}$ wherein Y is a constant not less than 0.65 and Z is a constant not greater than 0.85, and wherein c is a factor equal to ⅕ the tooth height.

2. In gearing, a basic rack from which can be generated both a ring gear and a mating pinion of one less tooth, said rack having teeth the half-contour of which is a segment of a logarithmic spiral of formula $r=c\epsilon^{0.70A}$ and tooth spaces the half-contour of which is a segment of a logarithmic spiral of formula $r=c\epsilon^{0.80A}$, wherein c is a factor equal to ⅕ the tooth height.

3. In gearing, a multi-tooth ring gear and a mating pinion having one less tooth, the shape of the teeth and tooth spaces of the gear and pinion corresponding in contour to those generated from a basic rack having teeth the half-contour of which is a segment of a logarithmic spiral of formula $r=c\epsilon^{YA}$ wherein Y is a constant not less than 0.65 and c is equal to ⅕ the tooth height, and tooth spaces the half-contour of which is a segment of a logarithmic spiral of formula $r=c\epsilon^{ZA}$ wherein Z is a constant not greater than 0.85.

4. In gearing, a ring gear of tooth shape corresponding to that generated from the basic rack defined in claim 1.

5. In gearing, a pinion of tooth shape corresponding to that generated from the basic rack defined in claim 1.

6. A ring gear and pinion set of tooth shape corresponding to that generated from the basic rack defined in claim 1 and having at least six teeth on the pinion and one more tooth on the ring gear than on the pinion.

7. In gearing, a multi-toothed basic rack from which can be generated both a ring gear and a mating pinion of one less tooth, said rack having teeth the half-contour of which corresponds to that segment of a logarithmic spiral of formula $r=c\epsilon^{0.70A}$ which is included between a right angle whose sides are equal respectively to the tooth height measured from the pitch line and to one-half the tooth width measured along the pitch line, and of which the radius vectors drawn from the two ends of the segment at the constant tangent angle pass through the pole of the spiral; said rack having tooth spaces the half-contour of which corresponds to that segment of a logarithmic spiral of formula $r=c\epsilon^{0.80A}$ which is included between a right angle whose sides are equal respectively to the tooth space depth measured from the pitch line and to one-half the space width measured along the pitch line, and of which the radius vectors drawn from the two ends of the segment at the constant tangent angle pass through the pole of the spiral; in which formulas c is equal to ⅕ the tooth height.

REGINALD J. S. PIGOTT.